United States Patent [19]
Volk

[11] Patent Number: 6,089,503
[45] Date of Patent: Jul. 18, 2000

[54] SELECTIVELY ROTATABLE AND TORSIONALLY FLEXIBLE AERODYNAMIC CONTROL APPARATUS

[76] Inventor: John Alan Volk, 803 Oakglade Dr., Monrovia, Calif. 91016

[21] Appl. No.: 09/231,281

[22] Filed: Jan. 15, 1999

[51] Int. Cl.[7] .................................................. B64C 3/38
[52] U.S. Cl. .................. 244/48; 244/35 R; 244/45 R; 244/46
[58] Field of Search ................ 244/39, 48, 35 R, 244/219, 45 R, 46, 198, 13, 221

[56] References Cited

U.S. PATENT DOCUMENTS

| | | | |
|---|---|---|---|
| 1,806,927 | 5/1931 | Aldrich | 244/48 |
| 2,182,366 | 12/1939 | Van Vliet | 244/38 |
| 2,731,216 | 1/1956 | Dillman | 244/48 |
| 3,153,523 | 10/1964 | Lowman, III | 244/48 |
| 3,743,218 | 7/1973 | Sweeney et al. | 244/36 |
| 4,330,100 | 5/1982 | Elber | 244/48 |
| 4,381,091 | 4/1983 | Pegram | 244/87 |
| 4,568,043 | 2/1986 | Schmittle | 244/48 |
| 4,776,534 | 10/1988 | Bamford | 244/123 |
| 4,863,117 | 9/1989 | Riout | 244/48 |
| 4,930,730 | 6/1990 | Quick | 244/224 |
| 5,098,034 | 3/1992 | Lendriet | 244/39 |
| 5,137,228 | 8/1992 | Vaughen | 244/17.25 |
| 5,181,678 | 1/1993 | Widnall et al. | 244/219 |
| 5,222,699 | 6/1993 | Albach et al. | 244/213 |
| 5,280,863 | 1/1994 | Schmittle | 244/48 |
| 5,509,623 | 4/1996 | Schmittle | 244/48 |
| 5,681,014 | 10/1997 | Palmer | 244/219 |

*Primary Examiner*—J. Woodrow Eldred
*Attorney, Agent, or Firm*—Terry J. Anderson; Karl J. Hoch, Jr.

[57] ABSTRACT

In accordance with the present invention, there is provided an aerodynamic control system which is attachable to an aircraft body and is operable between enhanced control and radar evasive modes. The aerodynamic control system is provided with an aerodynamic support structure which extends from the aircraft body. The support structure is rotatably attached to the aircraft body about a support structure rotational axis. The support structure has an outboard support and an inboard support which is disposed adjacent the aircraft body. The aerodynamic control system is further provided with an elongate torque member which extends from the aircraft body. The torque member has a torque rotational axis which is co-linear with the support structure rotational axis. The torque member further has an outboard end which is fixedly attached to the outboard support of the support structure. In the normal flight mode the inboard and outboard supports cooperatively rotate in response to rotation of the torque member. In the radar evasive mode the outboard support rotates relative to the inboard support in response to rotation of the torque member, thereby altering the aerodynamic characteristics of the aerodynamic control system for aircraft control.

26 Claims, 2 Drawing Sheets

SELECTIVELY ROTATABLE AND TORSIONALLY FLEXIBLE AERODYNAMIC CONTROL APPARATUS

FIELD OF THE INVENTION

The present invention relates generally to aerodynamic control surfaces, and more particularly to an aerodynamic control device which may selectively rotate and torsionally flex.

BACKGROUND OF THE INVENTION

Radar evasion aircraft technology is a topic of consideration. In particular, much attention has been concerned with aerodynamic control surface designs which have a mitigated radar signature.

As one of ordinary skill in the art will appreciate, radar evasive aircraft require a comparable degree of maneuverability while performing takeoff and landings than those aircraft not requiring radar evasive capabilities. One may also appreciate that radar evasive aircraft require a reduced level of maneuverability in the combat theatre than do those aircraft without radar evasive capabilities. This is because the radar evasive features tend to operationally mitigate the need for evasive maneuvering.

Traditional flaps and ailerons are rotatably attached to the leading and trailing edges of wings, and in some configurations, may extend forward or aft. These aerodynamic control surfaces are used to favorably alter both lift and drag characteristic, as well as, to provide rolling, pitching and yawing forces to maneuver the aircraft. The traditional aerodynamic control surfaces are known to provide a high degree of control authority, as they allow significant deflection of surfaces with large surfaces area.

An approach to mitigating radar signature is to have a smoothly blended outer surface over as much of the aircraft as possible. An example of such a design is seen in the U.S. military's B-2 bomber. The traditional hinged and extendible aerodynamic control surfaces tend to exhibit undesirable radar evasive characteristics when actuated. This is because such actuation tends to result in geometric discontinuities adjacent the control surface which results in unacceptable radar returns. In this regard, aerodynamic control surfaces which have ability to deflect while maintaining a continuous aerodynamic surface may have vastly superior radar mitigating characteristics than traditional surfaces.

Accordingly, there is a need in the art for an aircraft aerodynamic control system which functions to mitigate the aircraft radar signature while having the capability to provided substantial aerodynamic control to the aircraft during mission phases where mitigated radar signature is not required.

SUMMARY OF THE INVENTION

In accordance with the present invention, there is provided an aerodynamic control system which is operable between enhanced control and radar evasive modes. The control system is attachable to an aircraft body. In this respect the system may be directly attached to the aircraft body or indirectly by being attached to a lifting surface thereof. In a preferred embodiment, the control system is incorporated into an aircraft wing. The control system is provided with an aerodynamic support structure which extends from the aircraft body. The support structure is rotatably attached to the aircraft body about a support structure rotational axis. The support structure has an outboard support and an inboard support which is disposed adjacent the aircraft body. The aerodynamic control system is further provided with an elongate torque member which extends from the aircraft body. The torque member has a torque rotational axis which is co-linear with the support structure rotational axis. The torque member further has an outboard end which is fixedly attached to the outboard support of the support structure. A flexible outer skin is preferably provided which is disposed about the support structure, and generally defines an aerodynamic control surface of the wing.

In the enhanced control mode, the inboard and outboard supports cooperatively rotate in response to rotation of the torque member. The inboard support preferably engages the torque member and rotation of the inboard support relative to the torque member is restrained. As such, rotation of the torque member results in rotation of the support structure, and thus the aerodynamic control surface. In this respect, the angle-of-attack of the aerodynamic control surface is directly controlled via rotation of the torque member.

In the radar evasive mode the outboard support rotates relative to the inboard support in response to rotation of the torque member. The inboard support preferably engages the aircraft body and rotation of the inboard support relative to the aircraft body is restrained. The flexible outer skin deforms in response to rotation of the outboard support relative to the inboard support when the control system is in the radar evasive mode. As such, the outer skin assumes a twisted shape thereby altering the aerodynamic characteristics thereof. In particular, the twisting motion causes progressively larger incremental changes of the localized angle-of-attack along the aerodynamic control surface, with the greatest changes occurring towards the outboard support. Thus, aerodynamic control may be achieved by a selective twisting of the aerodynamic support structure, and hence the aerodynamic control surface.

The aerodynamic control system constructed in accordance with the present invention presents numerous advantages not found in the related prior art. In this respect, the control system is particularly adapted to operate between the enhanced control and radar evasive modes. It is contemplated that many prior art devices have been developed for achieving localized changes in angle-of-attack of an aircraft wing. For example, U.S. Pat. No. 1,806,927 to Aldrich, entitled, "WING CONTROL FOR AIRCRAFT" (incorporated herein by reference), teaches that an entire aircraft lifting surface may be rotated relative to the associated aircraft fuselage. Other examples are respectively taught by U.S. Pat. No. 5,681,014 to Palmer, entitled, "TORSIONAL TWIST AIRFOIL CONTROL MEANS" (incorporated herein by reference) and U.S. Pat. No. 4,330,100 to Elber, entitled, "MEANS FOR CONTROLLING AERODYNAMICALLY INDUCED TWIST," which teach twisting of an aircraft wing for achieving incremental changes of angle-of-attack across an aircraft wing. The devices taught by these prior art patents represent alternative design approaches for achieving a common goal of locally changing the angle-of-attack of an aircraft wing. In this regard, there has been no motivation to combine these competing design approaches.

Significantly, the aerodynamic control system of the present invention recognizes a synergistic relationship between the above-mentioned wing design concepts. The present invention recognizes that the radar evasive mode has the potential for a mitigated radar signature because the use of traditional control surfaces (i.e., trailing edge flaps, trim tabs, etc.) may be avoided. As mentioned above, aerodynamic control may be achieved by a selective twisting of the wing. The twisting motion of the wing results in the aerodynamic control surface undergoing a relatively smooth alteration or transition in shape. It is contemplated that, the twisting motion causes progressively larger incremental changes of the localized angle-of-attack, with the greatest changes occurring towards the outboard support. It is further contemplated that such smooth shape transitions or alterations are consistent with a relatively mitigated radar signature.

As mentioned above, when the control system of the present invention is operated in the enhanced control mode, the angle-of-attack of the support structure is directly controlled via rotation of the torque member. As one of ordinary skill in the art will appreciate, the enhanced control mode can provide a much greater degree of aircraft aerodynamic control or control authority in comparison to the radar evasive mode.

While the radar evasive mode control authority may be attenuated in comparison to the enhanced control mode, it is recognized that a high degree of control authority may not be tactically required when operating an aircraft in such a radar evasive mode. It is understood that an aircraft which successfully evades detection by radar, and thus is able to evade detection in general, may not need to perform aggressive maneuvers which require a high degree of control authority.

In contrast, where radar evasion is not of a primary concern a high degree of aerodynamic control authority may be tactically required. For example, where an aircraft has unsuccessfully avoided detection, aggressive maneuvering and thus a high degree of control authority may be required. Another example is where an aircraft returns from a radar evasive flight, but now must perform landing operations. Under such circumstances, the aircraft is not concerned so much about radar evasion as it is with having a high degree of available control authority. This concern is especially enhanced when performing nighttime aircraft carrier landings.

In addition, modern stealthy aircraft designs often require the associated aircraft to perform landing operations at a relatively high angle-of-attack in order to reduce speed while maintaining lift. This is because of the lack of dependance of traditional trailing edge flaps associated with such contemporary designs. As one of ordinary skill in the art can appreciate, such a high angle-of-attack landing configuration is relatively unstable and presents over-the-nose pilot visibility problems. The aerodynamic control system operated in the enhanced control mode advantageously facilitates the ability of the aircraft body to rotate downward towards a landing surface even though the wings thereof are held at a high angle-of-attack. In this respect, the control system of the present invention may be complementary with other radar evasion aircraft design technology.

As such, the aerodynamic control system constructed in accordance with the present invention represents a significant advancement in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
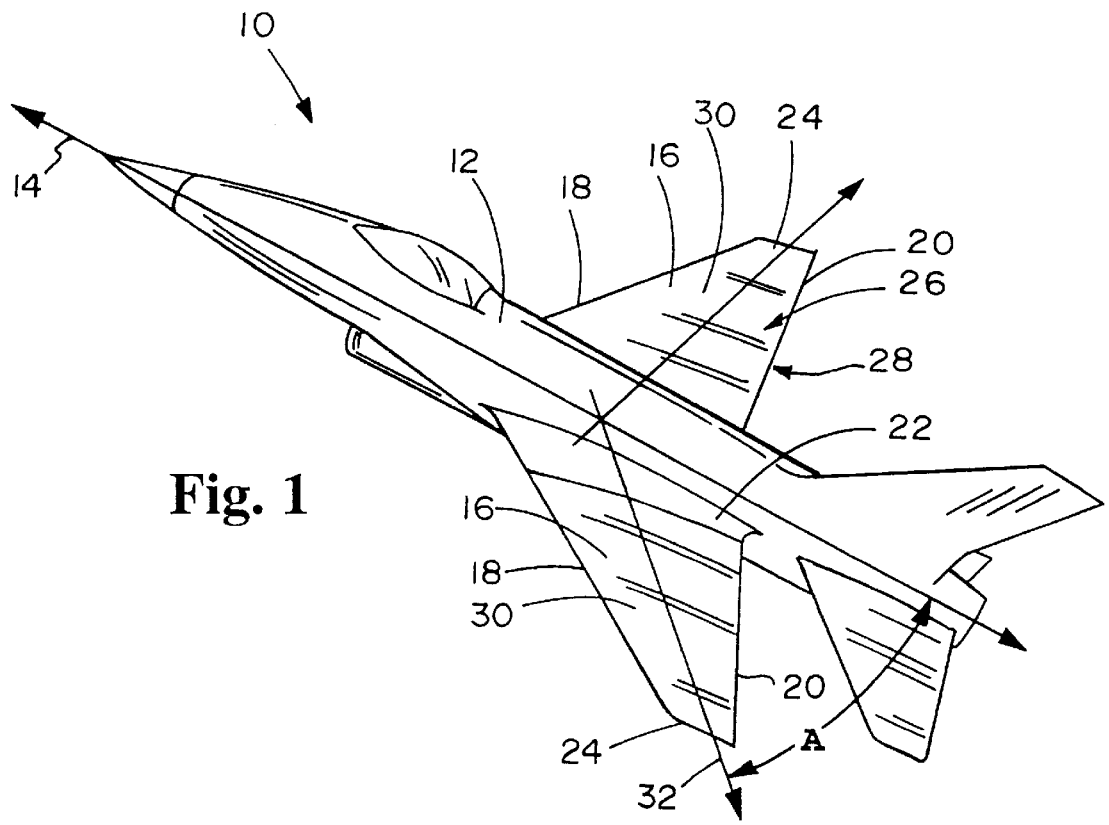
FIG. 1 is a perspective view of an aircraft having the aerodynamic control system of the present invention.

Referring now to the drawings wherein the showings are for purposes of illustrating preferred embodiments of the present invention only, and not for purposes of limiting the same, FIGS. 1–4 illustrate an aerodynamic control system constructed in accordance with the present invention. As will be described in more detail below, the control system is specifically adapted to operate between an enhanced control mode and a radar evasive mode.

Referring now to FIG. 1, there is symbolically depicted an aircraft 10. The aircraft 10 has an aircraft body or fuselage 12 which defines an aircraft longitudinal axis 14. In addition, the aircraft has a pair of opposing wings 16 which extend from the aircraft body 12. In accordance with the present invention, there is provided an aerodynamic control system which is attachable to the aircraft body 12. In this respect, the control system may be directly attached to the aircraft body 12 or indirectly be being attached to structures which extend from the aircraft body 12 such as wings 16, tail fins, tail rudders or other lifting surfaces. In the preferred embodiment of the present invention, the aerodynamic control system is incorporated into the aircraft wing design. The aerodynamic control surfaces 16, depicted in the form of a pair of opposing wings, are each defined by leading and trailing edges 18, 20, a base portion 22 adjacent the aircraft body 12 and a wing tip 24. The aerodynamic control surfaces 16 are each further provided with upper and lower aerodynamic surfaces 26, 28 thereof.

Figure 2:
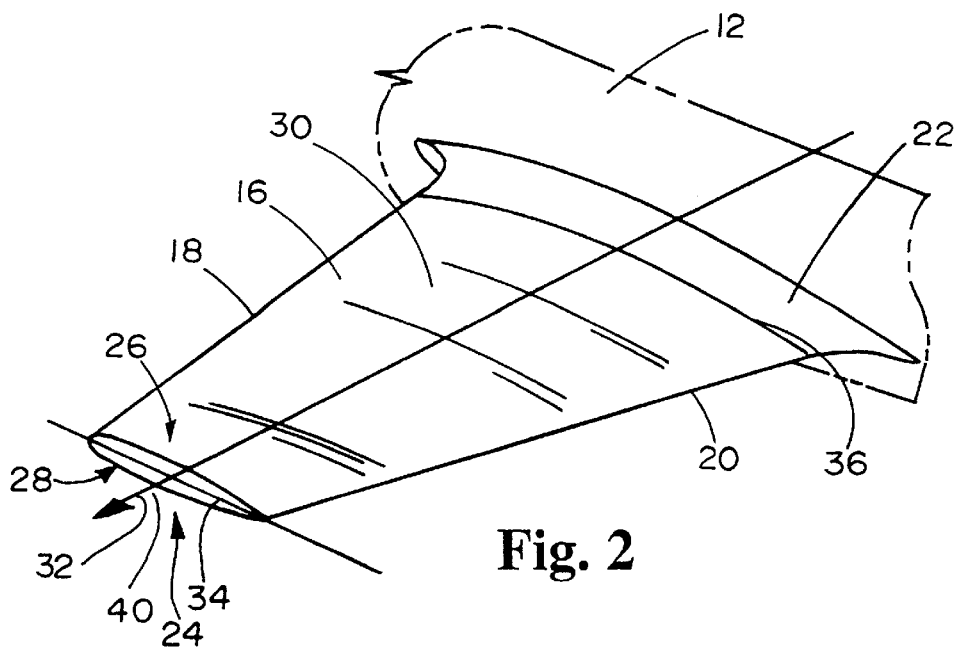
FIG. 2 is an enlarged perspective view of a wing of the aircraft of FIG. 1 (outer skin of the wing is depicted in outline form)

Referring additionally to FIG. 2, the control system is provided with an aerodynamic support structure 30 which extends from the aircraft body 12. The support structure is disposed internal to the aerodynamic control surface 16 and the upper and lower aerodynamic surfaces 26, 28 thereof. In this respect the support structure 30 structurally defines the shape of the aerodynamic control surface 16. As further discussed below, the support structure 30 is formed to rotate about a support structure rotation axis 32. The support structure rotation axis 32 is angularly disposed with reference to the aircraft longitudinal axis 14 at an angle A (as denoted in FIG. 1). In this respect, the support structure rotation axis 32 may be substantially perpendicular to the aircraft longitudinal axis 14. Other angular orientations are contemplated, such as smaller angles as in the case of aircraft designs having highly swept-back wings.

The support structure 30 is provided with an outboard support 34. The outboard support 34 generally disposed in the direction of the wing tip 25. In this respect, the outboard support 34 may be, although not required, disposed adjacent the wing tip 24. The support structure 30 is further provided with an inboard support 36 which is generally disposed adjacent wing base portion 22. The inboard and outboard supports 36, 34 take the form of structural spars or ribs of the aerodynamic control surface 16. It is contemplated that foam or honeycomb core material could replace such spars or ribs. In this regard, in practice, the support structure 30 will include additional supports which further define the shape and geometry of the aerodynamic control surfaces 16 which are distributed between the inboard and outboard supports 36, 34. In the preferred embodiment of the present invention, the inboard and outboard supports 36, 34 are similarly aligned in an orientation perpendicular to the support structure rotational axis 32. It is contemplated that the inboard and outboard supports 36, 34 may be aligned at other angular orientations as well.

The support sturcture 30 extend along the majority of the wings 16 thereof, as generally dipicted in the figures. It is contemplated, however, that the support structure 30 may only extend along a fraction or portion of the wings 15. In this respect, the outboard support 34 may be disposed some distance away from the wing tip 24 and the inboard support 36 may be disposed some distance away from the wing base 22.

Figure 3:
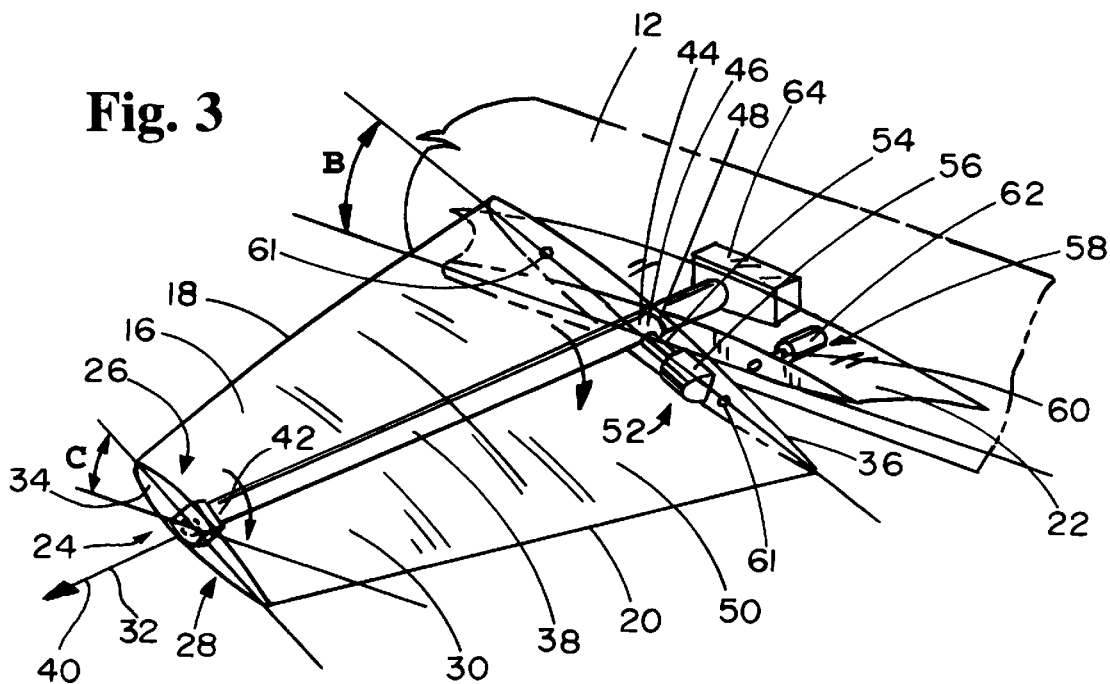
FIG. 3 is the wing of FIG. 2 depicting the aerodynamic control system of the present invention in an enhanced control mode.

Referring now to FIG. 3, the aerodynamic control system is further provided with a torque member 38. The torque member 36 extends laterally from the aircraft body 12 and is disposed interior to the aerodynamic control surface 16. The torque member 38 has a torque rotational axis 40 which is co-linear with the support structure rotational axis 40. The torque member 38 preferably takes the form of an elongate torque tube. The torque member 38 preferably has a circular cross-section, although other cross-sectional shapes are contemplated. In addition, for weight considerations, the torque member 36 is preferably formed to be hollow.

The torque member 38 further has outboard and inboard ends 42, 44. The outboard end 42 is fixedly attached to the outboard support 42 of the support structure 30 for rotating the outboard support 42 about the support structure rotation axis 32. The inboard end 44 is rotatably attached to the aircraft body 12 or the wing base 22. The torque member 38 is further provided with an engagement portion 46 which is interposed between the inboard and outboard ends 44, 42 and bias towards the inboard end 44. The inboard support 36 of the aerodynamic support structure 30 is provided with an engagement opening 48. The engagement opening 48 is disposed about the support structure rotation axis 32. The engagement opening 48 is sized and configured to received the torque member 38 therethrough. In particular, the torque member engagement portion 46 is cooperatively sized and configured to be in slidable rotational engagement with the engagement opening 48 of the inboard support 36. As such, the support structure 30 is rotatably attached to the aircraft body 12 via the torque member 38. The apparatus and methods for attaching the torque member 38 to the aircraft body 12 are chosen from those which are well known to one of ordinary skill in the art.

The torque member 38 is formed to be mechanically supportive of the structural support 30 in a cantilever fashion. In this regard, the torque member 38 and the apparatus for attaching the torque member 38 to the aircraft body 12 must be formed to have sufficient mechanical strength to be supportive of the shear and moment loads imposed thereon. In this respect, the torque member 38 may have a variable diameter with the diameter at the inboard end being larger than the diameter at the outboard end for mechanical strength considerations. As such, it is contemplated that larger diameters are preferable.

An outer skin 50 is preferably provided which is disposed about the support structure 30, and generally defines the upper and lower aerodynamic surfaces 26, 28 of the aerodynamic control surface 16. As such, the outer skin 50 conforms to the shape and geometry of the inboard and outboard supports 36, 34 of the aerodynamic support structure 30. As further discussed below, the outer skin 50 deforms in response to rotation of the outboard support 34 relative to the inboard support 36. In this regard, the outer skin 50 may be formed of a composite material which is configured for minimum torsional stiffness as referenced orthogonal to the rotational axis 32. Alternatively, the outer skin 50 may be form of an elastomeric material.

As mentioned above, the aerodynamic control system of the present invention is specifically adapted to operate between an enhanced control mode and a radar evasive mode. In the enhanced control mode, the inboard and outboard supports 36, 34 cooperatively rotate in response to rotation of the torque member 38. Referring now to FIG. 3, the inboard support 36 preferably engages the torque member 38, and rotation of the inboard support 36 relative to the torque member 38 is restrained. As such, rotation of the torque member 38 results in rotation of the support structure 30, and thus the entire aerodynamic control surface 16. In this respect, the angle-of-attack of the entire aerodynamic control surface 16 is directly controlled via rotational movement of the torque member 38. Rotation of the torque member 38, causes the inboard and outboard supports 36, 34 to rotate through respective angular displacements (respectively denoted as angles B and C). Preferably, the inboard and outboard supports 36, 34 are configured to rotate through the same respective angular displacements.

A torque member locking device 52 is preferably provided for engaging the inboard support 36 with the torque member 38. In this respect, the torque member locking device 52 is disposed internal to the aerodynamic control surface 16 adjacent the torque member engagement portion 46. The torque member locking device 52 is preferably provided with a torque member locking pin 54. The torque member locking pin 54 is sized and configured to engage the torque member and the inboard support in mechanical communication. The torque member engagement portion 46 may take the form of a notch which is sized and configured to received the torque member locking pin thereat 54. As such, the torque member locking pin 54 facilitates the controlled restraint of relative rotational movement of the torque member 38 to the inboard support 36. The torque member locking device 52 is further provided with a torque member locking device actuator 56 for engaging the torque member locking pin 54 in mechanical communication with the torque member 38 and the inboard support 36. The actuator 56 may be electro-mechanical in nature, such as a Solenoid device, or may be may be chosen from those which are well known to one of ordinary skill in the art. It is contemplated that other restraining arrangements may be employed such as braking or clamping devices.

Figure 4:
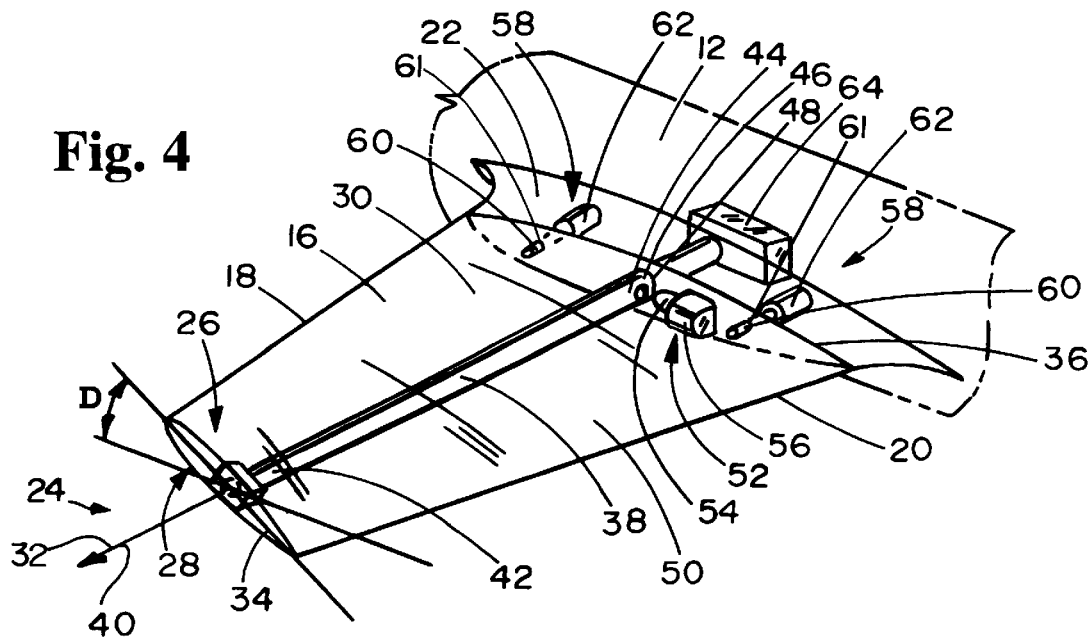
FIG. 4 is the wing of FIG. 2 depicting the aerodynamic control system of the present invention in a radar evasive mode.

In the radar evasive mode the outboard support 34 rotates relative to the inboard support 36 in response to rotation of the torque member 38. Referring now to FIG. 4, the inboard support 36 preferably engages the aircraft body 12 via the wing base 22 and thereby restraining rotational movement of the inboard support 36 relative to the aircraft body 12. As such, rotation of the torque member 38, causes the outboard support 34 to rotate through an angular displacement relative to the inboard support 36 (denoted as angle D). The outer skin 50, and thus the upper and lower aerodynamic surfaces 26, 28, deforms in response to rotation of the outboard support 34 relative to the inboard support 36 when the control system is in the radar evasive mode. As such, the outer skin 50 assumes a twisted shape thereby altering the aerodynamic characteristics thereof. In particular, the twisting motion causes progressively larger incremental changes of the localized angle-of-attack along the aerodynamic control surfaces 26, 28, with the greatest changes occurring towards the outboard support 34. Thus, aerodynamic control may be achieved by a selective twisting of the aerodynamic support structure 30, and hence the entire aerodynamic control surface 16.

An aircraft body locking device 58 is provided for engaging the inboard support 36 with the aircraft body 12 or the wing base 22 when the control system is operated in the radar evasion mode. The aircraft body locking device 58 comprises an aircraft body locking pin 60 (a pair is depicted). The aircraft body locking pin 60 engages the aircraft body 12 or the wing base 22 and the inboard support 36 in mechanical communication. In this respect, the inboard support 36 may be provided with a pin engagement hole 61 for receiving the engagement pin therein. The aircraft body locking device 58 further comprises an aircraft body locking device actuator 62 for engaging the aircraft body locking pin 60 in mechanical communication with the aircraft body 12 and the inboard support 36. The actuator 62 may be electro-mechanical in nature, such as a Solenoid device, or may be may be chosen from those which are well known to one of ordinary skill in the art. It is contemplated that other restraining arrangements may be employed such as braking or clamping devices.

A torque member rotational actuator device 64 is provided in mechanical communication with the torque member 38 for rotating the same 38. The torque member rotational actuator device 64 is disposed within the aircraft body 12 (as shown) or the wing base 22 and engages the torque member inboard end 44. The torque member rotational actuator device 64 applies torque thereat for rotating the torque member 38. As such, the torque member rotational actuator device 64 causes rotation of the torque member 38 while the control system is operated in both the enhanced control and radar evasion modes. The actuator device 64 is chosen from those which are well known to one of ordinary skill in the art, and may be electro-mechanical, pneumatic, or hydraulic in nature, for example.

In the preferred embodiment of the present invention in order to further enhance the mitigation of an observable aircraft radar signature, the outer skin 50 is formed of a radar absorptive material which is chosen from those which are well known to one of ordinary skill in the art. Additionally, the underlying aerodynamic support structure 30 may be formed of a radar absorptive material which is chosen from those which are well known to one of ordinary skill in the art.

In practice, the aerodynamic control system of the present invention preferably takes the form of opposing aircraft wings as described above. The control system may take the form other lifting surfaces such as tail fins, for example. Where the control system of the present invention is practiced in opposing lifting surfaces, such as the wings of aircraft 10, the torque members may rotate cooperatively, at differential rotational displacements or in opposing rotational direction. As one of ordinary skill in the art will appreciate, where one of the aerodynamic control surfaces 16 is deflected in a clockwise direction and the other aerodynamic control surface 16 is deflecting in an opposing direction, such rotation will influence the aircraft roll and/or yaw control. In addition, where the aerodynamic control surfaces are deflected in a similar rotational direction and through a similar angular displacement, such rotation may influence the aircraft pitch control.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An aerodynamic control system attachable to an aircraft body and operable between enhanced control and radar evasive modes, the aerodynamic control system comprising:

an aerodynamic support structure extending from the aircraft body, the aerodynamic support structure being rotatably attached to the aircraft body about a support structure rotational axis, the aerodynamic support structure having an outboard support and an inboard support disposed adjacent the aircraft body;

an elongate torque member extending from the aircraft body, the torque member having a torque rotational axis co-linear with the support structure rotational axis, the torque member having an outboard portion fixedly attached to the outboard support of the support structure;

wherein the normal fight mode the inboard and outboard supports cooperatively rotate in response to rotation of the torque member; and wherein the radar evasive mode the outboard support rotates relative to the inboard support in response to rotation of the torque member.

2. The aerodynamic control system of claim 1 wherein the enhanced control mode the inboard support is engaged with the torque member.

3. The aerodynamic control system of claim 2 wherein the enhanced control mode rotation of the inboard support relative to the torque member is restrained.

4. The aerodynamic control system of claim 2 further comprises a torque member locking device for engaging the inboard support with the torque member.

5. The aerodynamic control system of claim 4 wherein the torque member locking device comprises a torque member locking pin engagable in mechanical communication with the torque member and the inboard support.

6. The aerodynamic control system of claim 5 wherein the torque member locking device further comprises a torque member locking device actuator for engaging the torque member locking pin in mechanical communication with the torque member and the inboard support.

7. The aerodynamic control system of claim 1 wherein the radar evasive mode the inboard support is engaged with the aircraft body.

8. The aerodynamic control system of claim 7 wherein the radar evasive mode rotation of the inboard support relative to the aircraft body is restrained.

9. The aerodynamic control system of claim 7 further comprises an aircraft body locking device for engaging the inboard support with the aircraft body.

10. The aerodynamic control system of claim 9 wherein the aircraft body locking device comprises an aircraft body locking pin engagable in mechanical communication with the aircraft body and the inboard support.

11. The aerodynamic control system of claim 10 wherein the aircraft body locking device further comprises an aircraft body locking device actuator for engaging the aircraft body locking pin in mechanical communication with the aircraft body and the inboard support.

12. The aerodynamic control system of claim 1 wherein the torque member further having an inboard portion, the control system further comprises a torque member rotational actuator device in mechanical communication with the inboard portion for rotating the torque member.

13. The aerodynamic control system of claim 1 wherein the support structure being formed of a radar absorptive material.

14. The aerodynamic control system of claim 1 further comprises an outer skin disposed about the support structure, the outer skin is sized and configured to deform in response to rotation of the outboard support relative to the inboard support.

15. The aerodynamic control system of claim 14 wherein the outer skin is formed of a composite material configured for minimum torsional stiffness.

16. The aerodynamic control system of claim 14 wherein the outer skin is formed of an elastomeric material.

17. The aerodynamic control system of claim 14 wherein the outer skin is formed of a radar absorptive material.

18. The aerodynamic control system of claim 14 wherein the outer skin defines an aerodynamic control surface.

19. The aerodynamic control system of claim 1 wherein the aircraft body has an aircraft longitudinal axis and the support structure rotational axis is perpendicular to the aircraft longitudinal axis.

20. The aerodynamic control system of claim 1 wherein the aircraft body has an aircraft longitudinal axis and the support structure rotational axis is angled with respect to the aircraft longitudinal axis.

21. The aerodynamic control system of claim 1 wherein the control system comprises a portion of an aircraft wing.

22. An aircraft wing attachable to an aircraft body and operable between enhanced control and radar evasive modes, the aircraft wing comprising:

an aerodynamic support structure extending from the aircraft body, the aerodynamic support structure being rotatably attached to the aircraft body about a support structure rotational axis, the aerodynamic support structure having an outboard support and an inboard support disposed adjacent the aircraft body;

an elongate torque member extending from the aircraft body, the torque member having a torque rotational axis co-linear with the support structure rotational axis, the torque member having an outboard portion fixedly attached to the outboard support of the support structure;

wherein the enhanced control mode the inboard support is engaged with the torque member, and the inboard and outboard supports cooperatively rotate in response to rotation of the torque member; and wherein the radar evasive mode the inboard support is engaged with the aircraft body, and the outboard support rotates relative to the inboard support in response to rotation of the torque member.

23. The wing of claim 22 wherein the outboard support is disposed generally adjacent a wing tip of the wing.

24. An aircraft operable between enhanced control and radar evasive modes, the aircraft comprising:

an aircraft body;

a pair of opposing wings extending from the aircraft body, each of the wings having:

an aerodynamic support structure extending from the aircraft body, the aerodynamic support structure being rotatably attached to the aircraft body about a support structure rotational axis, the aerodynamic support structure having an outboard support and an inboard support disposed adjacent the aircraft body;

an elongate torque member extending from the aircraft body, the torque member having a torque rotational axis co-linear with the support structure rotational axis, the torque member having an outboard portion fixedly attached to the outboard support of the support structure;

wherein the enhanced fight mode the inboard support is engaged with the torque member, and the inboard and outboard supports cooperatively rotate in response to rotation of the torque member; and wherein the radar evasive mode the inboard support is engaged with the aircraft body, and the outboard support rotates relative to the inboard support in response to rotation of the torque member.

25. The aircraft of claim 24 wherein the torque members are rotatable in a same direction.

26. The aircraft of claim 24 wherein the torque members are rotatable in opposing directions.

* * * * *

UNITED STATES PATENT AND TRADEMARK OFFICE
CERTIFICATE OF CORRECTION

PATENT NO. : 6,089,503
DATED : July 18, 2000
INVENTOR(S) : John Alan Volk

Page 1 of 1

It is certified that error appears in the above-identified patent and that said Letters Patent is hereby corrected as shown below:

<u>Title page,</u>
Below item [76] insert the following:
-- [73] Assignee:
NORTHROP GRUMMAN CORPORATION
LOS ANGELES, CA --

Signed and Sealed this

Seventh Day of May, 2002

Attest:

JAMES E. ROGAN
*Attesting Officer*  *Director of the United States Patent and Trademark Office*